(12) United States Patent
Liu et al.

(10) Patent No.: US 11,026,130 B2
(45) Date of Patent: *Jun. 1, 2021

(54) METHOD, APPARATUS, AND SYSTEM FOR HANDOVER TO CIRCUIT SWITCHED DOMAIN

(71) Applicant: Huawei Technologies Co., Ltd., Shenzhen (CN)

(72) Inventors: Hai Liu, Shenzhen (CN); Xiaobo Wu, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

This patent is subject to a terminal disclaimer.

(21) Appl. No.: 16/439,888

(22) Filed: Jun. 13, 2019

(65) Prior Publication Data

US 2019/0297539 A1 Sep. 26, 2019

Related U.S. Application Data

(63) Continuation of application No. 15/944,622, filed on Apr. 3, 2018, now Pat. No. 10,362,513, which is a (Continued)

(51) Int. Cl.
*H04W 36/00* (2009.01)
*H04M 7/00* (2006.01)
(Continued)

(52) U.S. Cl.
CPC ..... *H04W 36/0022* (2013.01); *H04M 7/0057* (2013.01); *H04M 7/1225* (2013.01); *H04L 65/1046* (2013.01); *H04M 7/0066* (2013.01)

(58) Field of Classification Search
CPC ............ H04L 65/1046; H04M 7/0057; H04M 7/0066; H04M 7/1225; H04W 36/0022
See application file for complete search history.

(56) References Cited

U.S. PATENT DOCUMENTS

| 6,067,452 A | 5/2000 | Alexander |
| 6,731,934 B1 | 5/2004 | Mills |

(Continued)

FOREIGN PATENT DOCUMENTS

| CN | 101483896 A | 7/2009 |
| CN | 101790128 A | 7/2010 |

(Continued)

OTHER PUBLICATIONS

NTT Docomo, "CSFB triggerred by LCS while UE is in active VoIP session", 3GPP TSG SA WG2 Meeting #79, 6 pages.
(Continued)

*Primary Examiner* — Stephen J Clawson
(74) *Attorney, Agent, or Firm* — Slater Matsil, LLP

(57) ABSTRACT

A method, an apparatus and a system for a handover to a circuit switched domain are disclosed. In an embodiment, a system includes a mobility management entity (MME) and at least two a mobile switching center (MSCs), wherein the at least two MSCs comprise a first MSC capable of supporting a circuit switched fallback (CSFB) and a single radio voice call continuity (SRVCC) and a second MSC not capable of supporting the SRVCC, and wherein the MME is configured to select the first MSC for a user equipment (UE) from the at least two MSCs in a combined tracking area update procedure of the UE when a location service of a circuit switched (CS) domain triggers an SRVCC procedure for the UE and when the UE has a Voice over Internet Protocol (VOIP) service in progress.

8 Claims, 7 Drawing Sheets

Related U.S. Application Data continuation of application No. 14/593,905, filed on Jan. 9, 2015, now Pat. No. 9,961,593, which is a continuation of application No. PCT/CN2012/078630, filed on Jul. 13, 2012.

(51) Int. Cl.
*H04M 7/12* (2006.01)
*H04L 29/06* (2006.01)

(56) References Cited

U.S. PATENT DOCUMENTS

| | | | |
|---|---|---|---|
| 8,880,073 | B2 | 11/2014 | Vikberg |
| 2010/0142488 | A1 | 6/2010 | Zhang |
| 2010/0303041 | A1 | 12/2010 | Diachina |
| 2010/0317378 | A1 | 12/2010 | Fang et al. |
| 2010/0323695 | A1 | 12/2010 | Kallio |
| 2010/0329243 | A1 | 12/2010 | Buckley |
| 2011/0013597 | A1 | 1/2011 | Hwang et al. |
| 2011/0176536 | A1 | 7/2011 | De Franca Lima et al. |
| 2011/0201342 | A1 | 8/2011 | Wong et al. |
| 2012/0069817 | A1 | 3/2012 | Ling et al. |
| 2013/0195009 | A1 | 8/2013 | Ramle |
| 2013/0210466 | A1 | 8/2013 | Arvidsson et al. |
| 2013/0301466 | A1* | 11/2013 | Nenner ............ H04W 36/0022 370/252 |
| 2014/0177599 | A1 | 6/2014 | Tao |

FOREIGN PATENT DOCUMENTS

| | | |
|---|---|---|
| CN | 101854686 A | 10/2010 |
| CN | 101964965 A | 2/2011 |
| CN | 101983525 A | 3/2011 |
| CN | 102045791 A | 5/2011 |
| CN | 102209370 A | 10/2011 |
| CN | 102364976 A | 2/2012 |
| CN | 102404815 A | 4/2012 |

OTHER PUBLICATIONS

Huawei, "Update the misalignment in 23.002 related with SRVCC and CSFB", 3GPP TSG-SA1 Meeting #73, May 11-15, 2009, 10 pages.

"3rd Generation Partnership Project; Technical Specification Group Services and System Aspects; Functional Stage 2 description of Location Services (LCS) (Release 10)", 3GPP TS 23.271, v10.2.0, Mar. 2011, 169 pages.

"3rd Generation Partnership Project; Technical Specification Group Services and System Aspects; Single Radio Voice Call Continuity (SRVCC); Stage 2 (Release 11)", 3GPP TS 23.216 v11.5.0, Jun. 2012, 67 pages.

"3rd Generation Partnership Project; Technical Specification Group Services and System Aspects; Circuit Switched (CS) fallback in Evolved Packet System (EPS); Stage 2 (Release 11)", 3GPP TS 21.272 v11.1.0, Jun. 2012, 90 pages.

"3rd Generation Partnership Project; Technical Specification Group Core Network and Terminals; General Packet Radio Service (GPRS); GPRS Tunnelling Protocol (GTP) across the Gn and Gp interface (Release 11)", 3GPP TS 29.060 v11.3.0, Jun. 2012, 174 pages.

"3rd Generation Partnership Project; Technical Specification Group Core Network and Terminals; Domain Name System Procedures; Stage 3 (Release 11)", 3GPP TS 29.303 V11.1.0, Jun. 2012, 56 pages.

NEC, "Clarification on the MSC selection mechanism in the MME/SGSN", Change Request, 3GPP TSG SA WG2 Meeting #84, Apr. 11-15, 2011, S2-112151, 7 pages.

Huawei, et al., "Clarification for MME selection of MSC Server during SRVCC procedure", Change Request, SA WG2 Meeting #97, May 27-31, 2013, S2-131926, 11 pages.

Huawei, et al., "Clarification for MME selection during NW-initiated CS Service procedure while UE is in IMS VoIP session", Change Request, SA WG2 Meeting #97, May 27-31, 2013, S2-132073, 4 pages.

* cited by examiner

METHOD, APPARATUS, AND SYSTEM FOR HANDOVER TO CIRCUIT SWITCHED DOMAIN

CROSS-REFERENCE TO RELATED APPLICATIONS

This application is a continuation of U.S. patent application Ser. No. 15/944,622, filed on Apr. 3, 2018, which is a continuation of U.S. patent application Ser. No. 14/593,905, filed on Jan. 9, 2015, now U.S. Pat. No. 9,961,593, which is a continuation of International Application No. PCT/CN2012/078630, filed on Jul. 13, 2012. All of the aforementioned patent applications are hereby incorporated by reference in their entireties.

TECHNICAL FIELD

The present invention relates to the field of communication technologies, and in particular, to a method, apparatus, and system for a handover to a circuit switched domain.

BACKGROUND

The 3GPP (3rd Generation Partnership Project, 3rd Generation Partnership Project) standards organization has now proposed a new-generation evolved network architecture, in which a core network part is an SAE (System Architecture Evolution, System Architecture Evolution) network and an access network part is an LTE (Long Term Evolution, Long Term Evolution) network, also called an E-UTRAN (Evolved Universal Terrestrial Radio Access Network, terrestrial radio access network for an evolved universal mobile communication system). The E-UTRAN is formed by eNBs (evolutional Node Bs, evolved NodeBs). The SAE network is formed by two parts: MME (Mobility Management Entity, mobility management entity) and SAE gateway. SAE gateways include a serving gateway (Serving Gateway) and a PDN Gateway (Packet Data Network Gateway, packet data network gateway). An MME is a node on a control plane of the core network part and is in charge of managing a context of a UE (User Equipment, user equipment) and bearers on a user plane. A serving gateway takes care of transmitting subscriber service data, and a PDN Gateway is in charge of transmitting subscriber signaling data.

When a UE is performing a VOIP (Voice over Internet Protocol, voice over Internet Protocol) service in a PS (Packet Switch, packet switched) domain of an SAE/LTE network, if a CS MT-LR (Mobile Terminating Location Request, mobile terminated location request) procedure is triggered due to a location service of a CS (Circuit Switch, circuit switched) domain, an SRVCC (Single Radio Voice Call Continuity, single radio voice call continuity) procedure needs to be executed to hand over the UE back to the CS domain. After the UE is handed over back to the CS domain, an MSC for previous combined attach notifies the UE of providing location information. In this scenario, if the selected MSC does not have an SRVCC capability, the UE is unable to complete the location service of the CS domain.

SUMMARY

Embodiments of the present invention provide a method, apparatus, and system for a handover to a circuit switched domain, so that a UE with an ongoing VOIP service is able to be correctly handed over to a CS domain. The technical solutions are as follows:

According to an aspect, a method for a handover to a circuit switched domain is provided, including selecting a mobile switching center MSC capable of both circuit switched fallback CSFB and single radio voice call continuity SRVCC for a user equipment UE and selecting the MSC capable of both CSFB and SRVCC for the UE in an SRVCC procedure if a location service of a circuit switched CS domain triggers the SRVCC procedure for the UE during an ongoing voice over Internet Protocol VOIP service of the UE, so that the UE, after being handed over to the CS domain, accesses the MSC and implements the location service of the CS domain.

According to another aspect, an apparatus for a handover to a circuit switched domain is provided, including a first selecting module, configured to select a mobile switching center MSC capable of both circuit switched fallback CSFB and single radio voice call continuity SRVCC for a user equipment UE and a second selecting module, configured to: if a location service of a circuit switched CS domain triggers an SRVCC procedure for the UE when the UE has voice over Internet Protocol VOIP service in progress, select the MSC that is selected by the first selecting module and is capable of both CSFB and SRVCC for the UE in the SRVCC procedure, so that the UE, after being handed over to the CS domain, accesses the MSC and implements the location service of the CS domain.

According to still another aspect, a system for a handover to a circuit switched domain is provided, including a UE and the apparatus for a handover to a circuit switched domain; the UE is configured to: if a location service of a circuit switched CS domain triggers a single radio voice call continuity SRVCC procedure when the UE has a voice over Internet Protocol VOIP service in progress, hand over to the CS domain to access a mobile switching center MSC that is selected by the apparatus and is capable of both circuit switched fallback CSFB and SRVCC, and implement the location service of the CS domain.

Beneficial effects of technical solutions provided by the embodiments of the present invention are as follows: an MSC capable of both CSFB and SRVCC is selected for a UE, and if a location service of a CS domain triggers an SRVCC procedure for the UE when a VOIP service of the UE is in progress, the MSC capable of both CSFB and SRVCC is selected in the SRVCC procedure. In this way, it is ensured that the UE can correctly access the CSFB enabled MSC to implement the location service in the CS domain while the SRVCC procedure can continue normally, thereby solving a problem in the prior art where a UE is incapable of implementing a location service of a CS domain when an MME selects an SRVCC-incapable MSC in combined attach.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
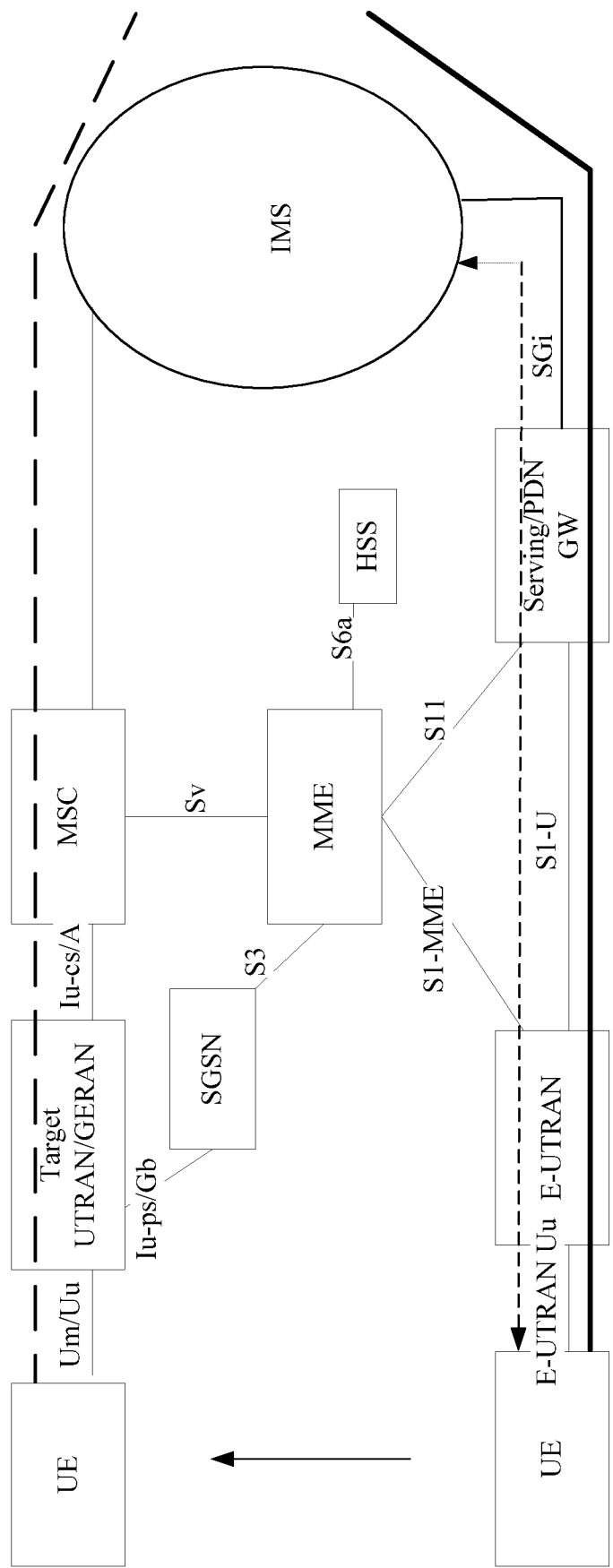
FIG. 1 is a schematic diagram of a network architecture according to an embodiment of the present invention.

Refer to FIG. 1, which is a schematic diagram of a network architecture applied in an embodiment of the present invention. The upper part in FIG. 1 is a 2G/3G network. The 2G access network is a GERAN (GSM EDGE Radio Access Network, GSM EDGE radio access network), and the 3G access network is a UTRAN (UMTS Terrestrial Radio Access Network, UMTS terrestrial radio access network). Devices such as an MSC are included in the 2G/3G network. In the embodiments of the present invention, an MSC may also be called an MSC server, and for ease of description, only the concept of MSC is applied in the remainder of this application, unless otherwise stated. In the 2G/3G network, a voice service is generally borne by a CS domain and a data service is generally borne by a PS domain. The middle part in FIG. 1 is an SAE network and the lower part is an LTE network, including devices such as an SGSN, an MME, an HSS (Home Subscriber Server, home subscriber server) and a Serving/PDN GW. The SAE/LTE network serves as a packet switched system over a PS domain. A voice service can only be borne by a PS domain for transmission, and the voice service is controlled by an IMS (IP Multimedia Subsystem, IP multimedia subsystem) over the IP-based bearer network. When a UE is located in a PS domain, an MME provides services for the UE. When the UE is located in a CS domain, an MSC provides services for the UE. In the embodiments of the present invention, a handover of a UE to a CS domain means that the UE is handed over from the PS domain to the CS domain when the UE has a VOIP service in progress.

The embodiments of the present invention further relate to a CSFB technology. In the CSFB technology, the UE performs combined attach (Combined Attach) to fall back from a PS domain of LTE to a CS domain of a 2G/3G network. In the combined attach procedure, an MME selects an MSC for the UE so that the MSC provides services for the UE when the UE falls back to the CS domain.

Figure 2:
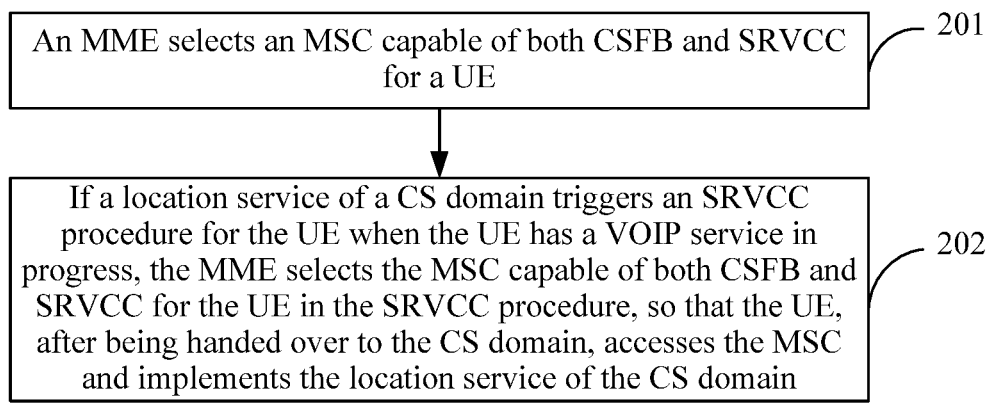
FIG. 2 is a flowchart of a method for a handover to a circuit switched domain according to an embodiment of the present invention.

Referring to FIG. 2, a method for a handover to a circuit switched domain is provided according to an embodiment of the present invention, including:

201: Select a mobile switching center MSC capable of both circuit switched fallback CSFB and single radio voice call continuity SRVCC for a user equipment UE.

202: Select, if a location service of a circuit switched CS domain triggers an SRVCC procedure for the UE when the UE has a voice over Internet Protocol VOIP service in progress, the MSC capable of both CSFB and SRVCC for the UE in the SRVCC procedure, so that the UE, after being handed over to the CS domain, accesses the MSC and implements the location service of the CS domain.

The foregoing method according to this embodiment may be executed by an MME.

In the foregoing method provided by this embodiment, an MSC capable of both CSFB and SRVCC is selected for a UE, and if a location service of a CS domain triggers an SRVCC procedure for the UE when a VOIP service of the UE is in progress, the MSC capable of both CSFB and SRVCC is selected in the SRVCC procedure. In this way, it is ensured that the UE can correctly access the CSFB-capable MSC while the SRVCC procedure can continue normally, thereby solving a problem in the prior art where a UE is incapable of implementing a location service of a CS domain when an MME selects an SRVCC-incapable MSC in combined attach.

Figure 3:
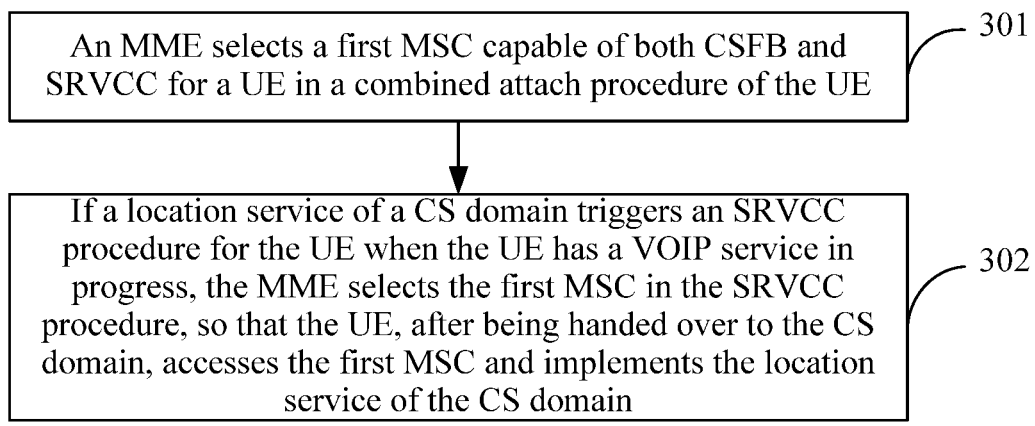
FIG. 3 is a flowchart of a method for a handover to a circuit switched domain according to another embodiment of the present invention.

Referring to FIG. 3, a method for a handover to a circuit switched domain is provided according to another embodiment of the present invention. The following description is based on an example in which an MSC capable of both CSFB and SRVCC is selected by an MME in a combined attach procedure. The method specifically includes:

301: In a combined attach procedure of a UE, an MME selects a first MSC capable of both CSFB and SRVCC for the UE.

Generally, the UE performs a combined attach procedure when the UE is powered on. In the combined attach procedure, the UE is first attached to the MME of a PS domain, and then the MME selects an MSC for the UE and sends an update location request to the MSC, so that the UE is then handed over to the CS domain and the MSC provides services for the UE. The procedure in which the UE is attached to the MME and attached to the MSC is a combined attach procedure. In this embodiment, the MME selects the first MSC capable of both CSFB and SRVCC for the UE, so that the UE can be correctly handed over to the CS domain when a subsequent SRVCC procedure is performed.

302: If a location service of the CS domain triggers an SRVCC procedure for the UE during an ongoing VOIP service of the UE, the MME selects the first MSC in the SRVCC procedure, so that the UE, after being handed over to the CS domain, accesses the first MSC and implements the location service of the CS domain.

The VOIP service is a service of the UE in the PS domain. The location service of the CS domain is a CS-domain mobile terminated location service CS MT-LR that is triggered by the location service of the UE in the CS domain. For example, if the UE serves as a called party to receive a call from the CS domain, the MSC pages the UE in the CS domain and requests the UE to provide its location information.

The location service of the CS domain triggers the SRVCC procedure, and by means of the SRVCC procedure, the UE can be handed over from the PS domain to the CS domain. In this procedure, the MME selects an MSC for the UE so that the MSC provides services for the UE after the UE is handed over to the CS domain. In this embodiment, the MME selects, in the SRVCC procedure, the MSC that is the same as the MSC selected in the combined attach procedure. Because the MSC is capable of both CSFB and SRVCC, it is ensured that the UE can be correctly handed over to the CS domain. When the UE has accessed the first MSC, it means that the UE has already been handed over to the CS domain, and in this case, the MSC can provide services for the UE.

Figure 4:
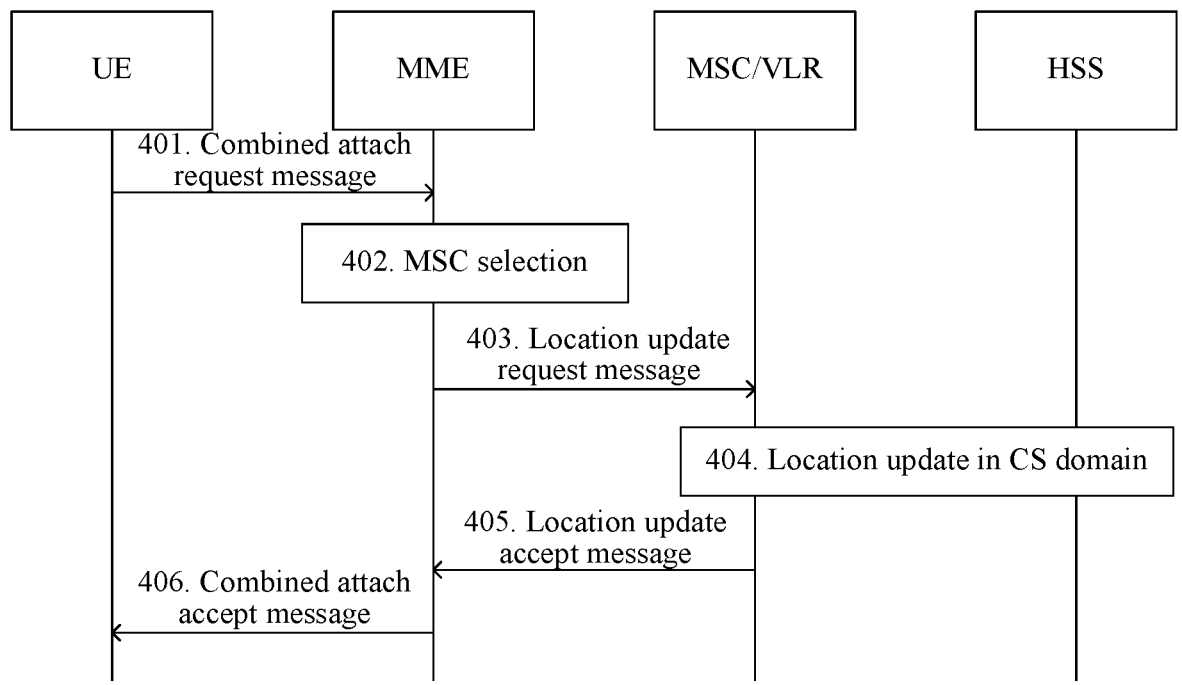
FIG. 4 is a schematic diagram of a combined attach procedure according to still another embodiment of the present invention.

Refer to FIG. 4. In this embodiment, the combined attach procedure in step 301 may specifically include:

401: A UE sends a combined attach request message to an MME to request performing combined attach, where the message includes an indication representative of combined attach.

402: After receiving the combined attach request message, the MME selects an MSC capable of both CSFB and SRVCC for the UE.

403: The MME sends a location update request message to the selected MSC to request a location update.

404: After receiving the location update request message sent by the MME, the MSC interacts with an HSS to perform a location update for the UE towards the CS domain.

405: The MSC sends a location update accept message to the MME.

406: After receiving the location update accept message, the MME sends a combined attach accept message to the UE. The combined attach procedure ends.

Through the foregoing combined attach procedure, an MME selects an MSC capable of both CSFB and SRVCC for a UE to avoid a problem where a subsequent SRVCC procedure cannot continue normally because the selected MSC does not support SRVCC. Meanwhile, the MSC further supports CSFB, so that the procedure of handing over the UE to a CS domain can be performed normally.

Figure 5:
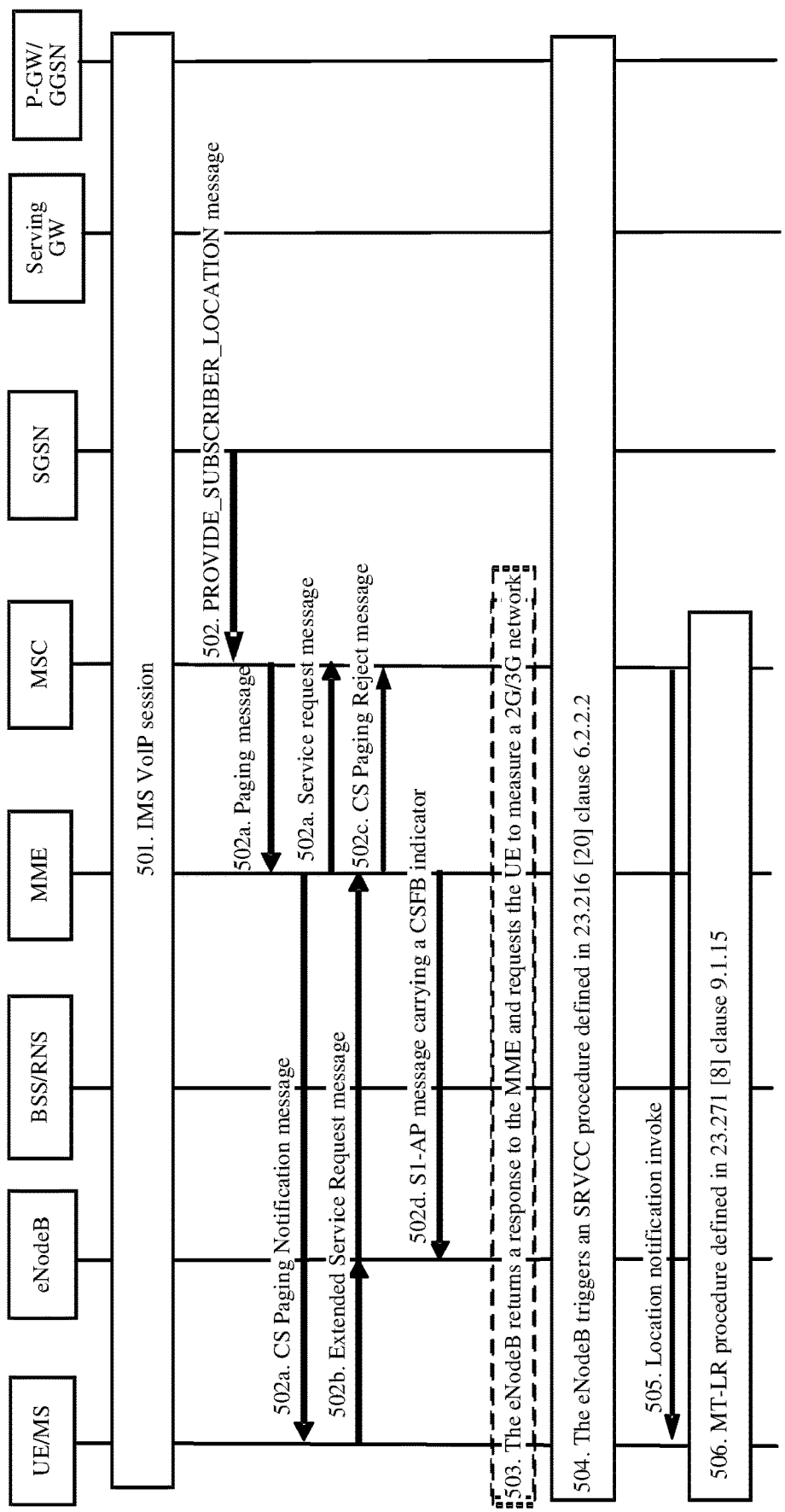
FIG. 5 is a schematic diagram of an SRVCC procedure triggered by a location service according to yet another embodiment of the present invention.

Refer to FIG. 5. In this embodiment, the SRVCC procedure in step 302 which is triggered by a location service of a CS domain for a UE with an ongoing VOIP service may specifically include:

501: The UE is implementing the VOIP service in a PS domain.

502: Because the location service of the CS domain triggers a CS-domain mobile terminated location service CS MT-LR, an MSC receives a provide subscriber location message, which is a request for providing location information.

502a: The MSC sends a paging request message to an MME. The MME sends a CS paging notification message to the UE to notify the UE that this is a paging due to the location service, and sends a service request message to the MSC.

502b: The UE sends an extended service request message to the MME.

502c: If the MME determines that the UE rejects the current CS MT-LR request, the MME sends a CS Paging Reject message to the MSC.

502d: If the MME determines that the UE accepts the current CS MT-LR request, the MME sends a message to notify an eNodeB, where the message includes a CSFB indicator.

503: After receiving the message, the eNodeB returns a response message to the MME and requests the UE to measure a 2G/3G network according to the CSFB indicator.

504: The eNodeB determines and triggers execution of the SRVCC procedure and hands over the UE to the 2G/3G network. In the SRVCC procedure, the MME selects an MSC that is the same as the MSC selected in the foregoing combined attach procedure. Because the MSC is capable of both CSFB and SRVCC, it is ensured that the MSC to which the UE is connected after the UE is handed over to the CS domain is the MSC in step 502a. In this case, the CS location service can be continued.

505: After the handover is complete for the UE, the MSC sends an LCS (Location Notification Invoke, location notification invoke) message to the UE.

506: After receiving the location notification invoke message, the UE implements the location service and provides its location information to the MSC. The procedure ends.

In the foregoing method according to this embodiment, an MSC capable of both CSFB and SRVCC is selected by an MME for a UE, and if a location service of a CS domain triggers an SRVCC procedure for the UE when the UE has a VOIP service in progress, the MSC capable of both CSFB and SRVCC is selected in the SRVCC procedure. In this way, it is ensured that the UE can correctly access the CSFB-capable MSC while the SRVCC procedure can continue normally, thereby solving a problem in the prior art where a UE is incapable of implementing a location service of a CS domain when an MME selects an SRVCC-incapable MSC in combined attach.

Figure 6:
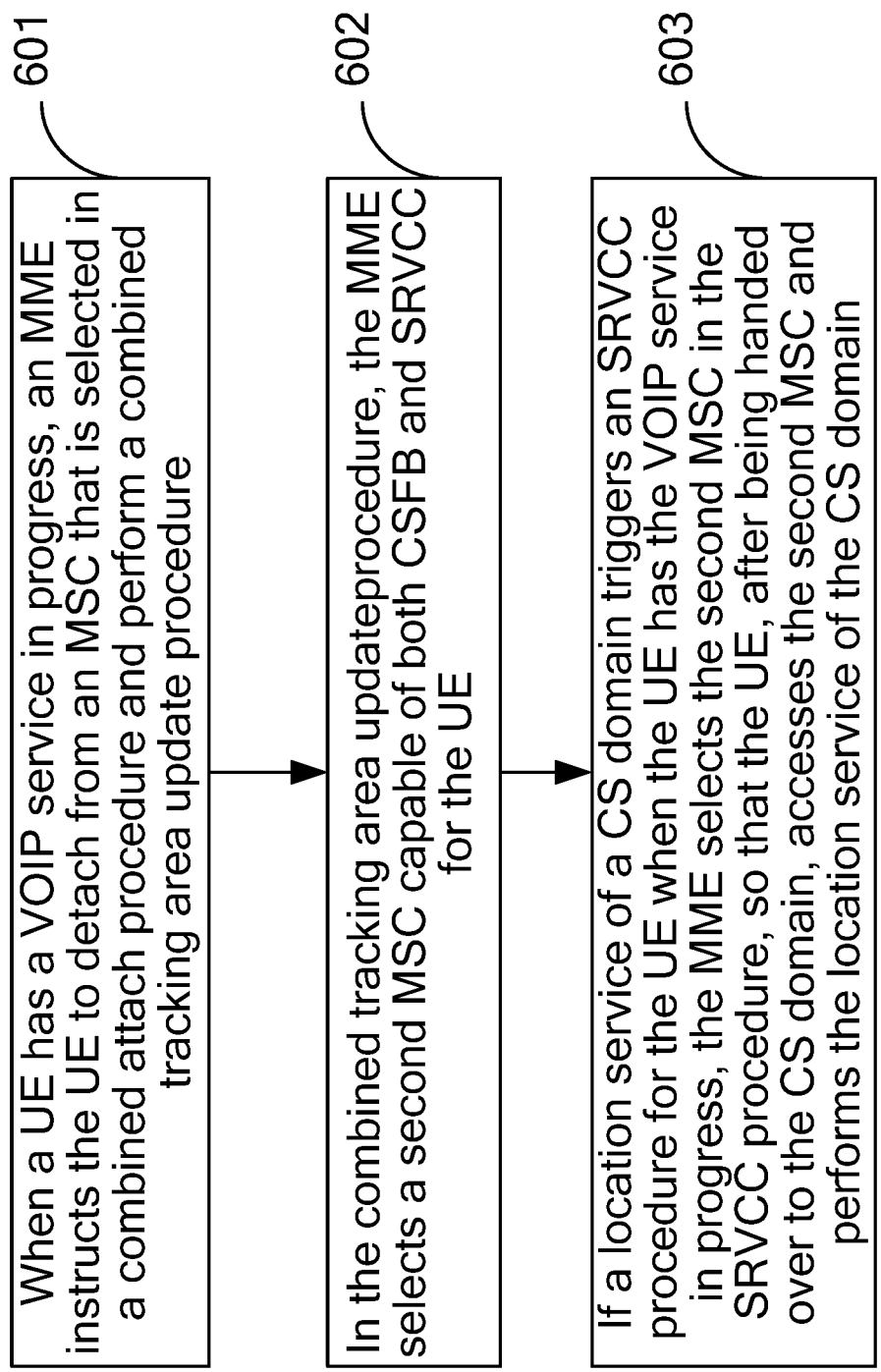
FIG. 6 is a flowchart of a method for a handover to a circuit switched domain according to another embodiment of the present invention.

Refer to FIG. 6. A method for a handover to a circuit switched domain is provided in another embodiment of the present invention. The following description is based on an example in which an MSC capable of both CSFB and SRVCC is selected by an MME in a combined tracking area update procedure. The method specifically includes:

601: When a UE has a VOIP service in progress, an MME sends to the UE an IMSI (International Mobile SubscriberIdentification Number, international mobile subscriber identity) detach message instructing the UE to detach from an MSC selected in a combined attach procedure and perform a Combined TAU (Combined Tracking Area Update, combined tracking area update) procedure.

Before the UE implements the VOIP service, the MME has already selected an MSC for the UE through a combined attach procedure that has been performed. Specifically, the MME may select an MSC according to an existing procedure.

In this embodiment, the MME detects whether the UE is implementing the VOIP service. When it is detected that the UE is implementing the VOIP service, a message is sent to the UE to instruct the UE to detach from the MSC selected in the combined attach procedure, so as to release an association relationship between the UE and the MSC, and instruct the UE to initiate a combined tracking area update procedure, so as to perform combined attach for the UE again. The method for the MME to detect whether the UE is implementing the VOIP service specifically includes: According to a bearer established for the UE, the MME determines whether a QCI (QoS Class Identify, QoS class identify) of the bearer is equal to 1. If the QCI is equal to 1, the MME determines that the UE is implementing the VOIP service. If the QCI is not equal to 1, the MME determines that the UE is not implementing the VOIP service.

602: In a combined tracking area update procedure, the MME selects a second MSC capable of both CSFB and SRVCC for the UE.

In the combined tracking area update procedure, the MME performs combined attach for the UE again. In this way, an MSC capable of both CSFB and SRVCC can be selected, so that the UE may be correctly handed over to a CS domain in a subsequent procedure.

603: If a location service of a CS domain triggers an SRVCC procedure for the UE during the ongoing VOIP service of the UE, the MME selects the second MSC in the SRVCC procedure, so that the UE, after being handed over to the CS domain, accesses the second MSC and implements the location service of the CS domain.

Figure 7:
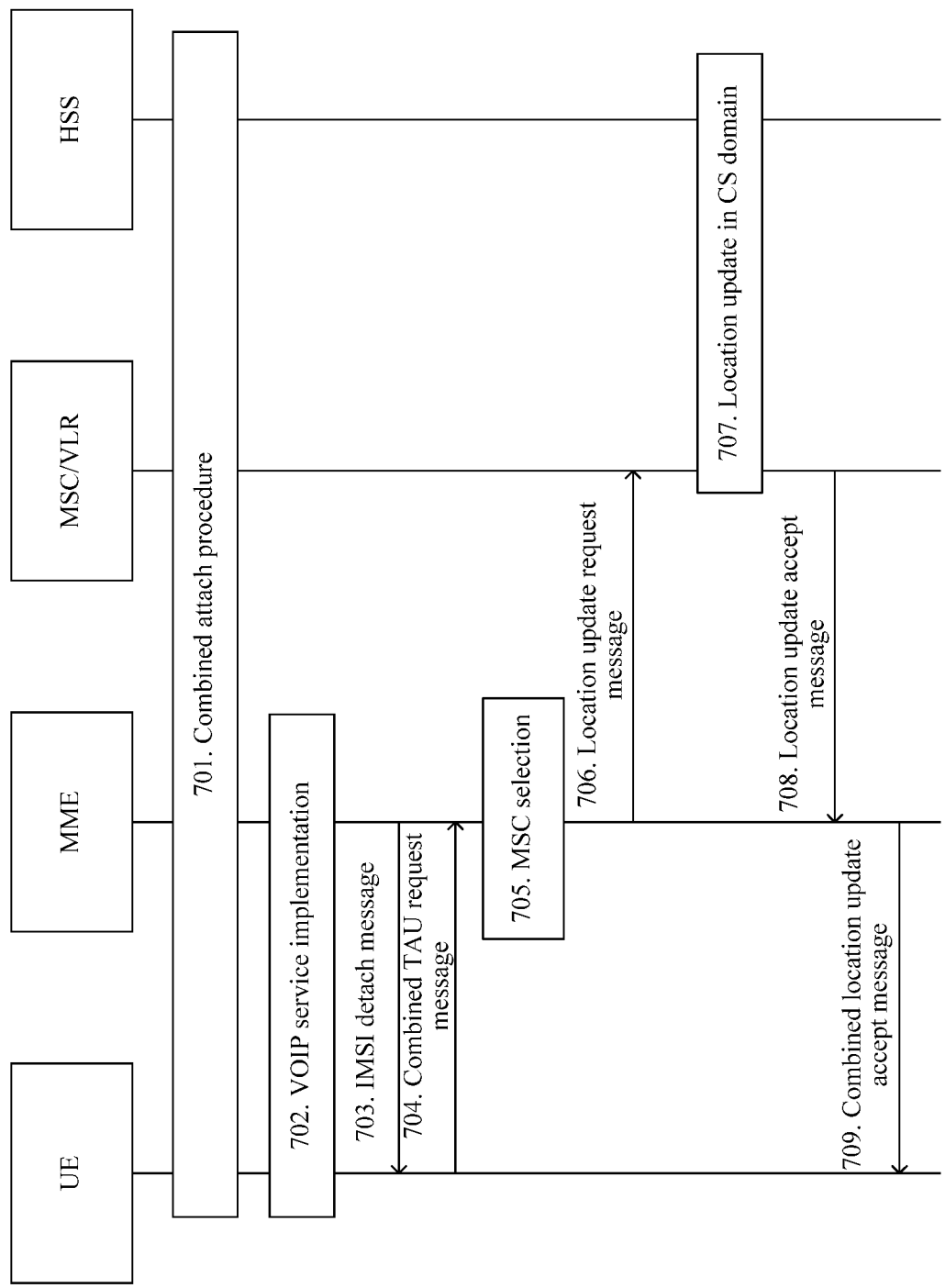
FIG. 7 is a schematic diagram of a combined tracking area update procedure according to still another embodiment of the present invention.

Refer to FIG. 7. In this embodiment, the combined tracking area update procedure in step 601 may specifically include:

701: A UE performs a combined attach procedure, and during this procedure, the UE is attached to an MME and attached to an MSC.

702: The UE implements a VOIP service.

703: After detecting that the UE is implementing the VOIP service, the MME sends an IMSI detach message to the UE to instruct the UE to detach from the foregoing MSC and perform a combined tracking area update procedure.

When implementing the VOIP service, the UE performs a bearer setup procedure. In the bearer setup procedure, the MME makes a determination according to a QCI (QoS Class Identifier, QoS class identifier) in the received message. If a value of the QCI is 1, it indicates that the UE is implementing the VOIP service. If a value of the QCI is 0, it indicates that the UE is not implementing the VOIP service.

704: After receiving the IMSI detach message, the UE sends a Combined TAU message to the MME to initiate the combined tracking area update procedure.

705: The MME reselects an MSC capable of both CSFB and SRVCC.

706: The MME sends a location update request message to the reselected MSC to request a location update.

707: After receiving the location update request message sent by the MME, the MSC interacts with an HSS to perform a location update for the UE towards the CS domain.

708: The MSC sends a location update accept message to the MME.

709: After receiving the location update accept message, the MME sends a combined tracking area update accept message to the UE. The combined tracking area update procedure ends.

An SRVCC procedure triggered based on a location service in the CS domain after the UE performs the tracking area update procedure is similar to the procedure illustrated in FIG. 5, and details are not described herein again. A difference is that, in the SRVCC procedure in step 504, the MME selects an MSC that is the same as the MSC selected in the foregoing combined attach procedure, whereas in this SRVCC procedure, the MME selects an MSC that is the same as the MSC selected in the foregoing combined tracking area update procedure. By means of the foregoing procedure, it is ensured that the UE can be correctly handed over to the CS domain.

In the foregoing method provided in this embodiment, an MSC capable of both CSFB and SRVCC is selected for a UE by an MME, and if a location service of a CS domain triggers an SRVCC procedure for the UE during an ongoing VOIP service of the UE, the MSC capable of both CSFB and SRVCC is selected in the SRVCC procedure. In this way, it is ensured that the UE can correctly access the CSFB-capable MSC, thereby solving a problem in the prior art where a UE is incapable of implementing a location service of a CS domain when an MME selects an SRVCC-incapable MSC in combined attach.

Figure 8:
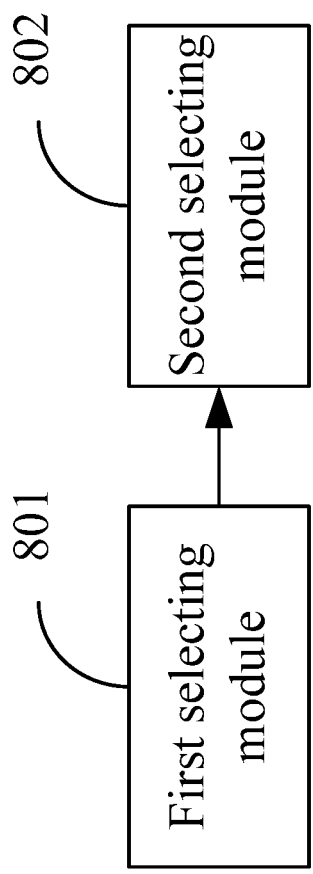
FIG. 8 is an architecture diagram of an apparatus for a handover to a circuit switched domain according to yet another embodiment of the present invention.

Referring to FIG. 8, an apparatus for a handover to a circuit switched domain is provided in yet another embodiment of the present invention, including:

a first selecting module 801, configured to select a mobile switching center MSC capable of both circuit switched fallback CSFB and single radio voice call continuity SRVCC for a user equipment UE; and a second selecting module 802, configured to: if a location service of a circuit switched CS domain triggers an SRVCC procedure for the UE when the UE has a VOIP service in progress, select the MSC that is selected by the first selecting module 801 and is capable of both CSFB and SRVCC for the UE in the SRVCC procedure, so that the UE, after being handed over to the CS domain, accesses the MSC and implements the location service of the CS domain.

In one aspect, the first selecting module 801 may be specifically configured to select a first MSC capable of both CSFB and SRVCC for the UE in a combined attach procedure of the UE.

Correspondingly, the second selecting module 802 may be specifically configured to: if the location service of the CS domain triggers an SRVCC procedure for the UE when the UE has the VOIP service in progress, select the first MSC which is selected by the first selecting module 801 in the SRVCC procedure, so that the UE, after being handed over to the CS domain, accesses the first MSC and implements the location service of the CS domain.

In another aspect, the first selecting module 801 may be specifically configured to: when the UE is implementing the VOIP service, send to the UE an IMSI detach message instructing the UE to detach from an MSC selected in a combined attach procedure and perform a combined tracking area update procedure. In the combined tracking area update procedure, a second MSC capable of both CSFB and SRVCC is selected for the UE.

Correspondingly, the second selecting module 802 may be specifically configured to: if the location service of the CS domain triggers an SRVCC procedure for the UE when the UE has the VOIP service in progress, select the second MSC which is selected by the first selecting module 801 in the SRVCC procedure, so that the UE, after being handed over to the CS domain, accesses the second MSC and implements the location service of the CS domain.

The foregoing apparatus provided in this embodiment may be specifically an MME.

The foregoing apparatus provided in this embodiment is configured to select an MSC capable of both CSFB and SRVCC for a UE, and if a location service of a CS domain triggers an SRVCC procedure for the UE during an ongoing VOIP service of the UE, select the MSC capable of both CSFB and SRVCC in the SRVCC procedure. In this way, it is ensured that the UE can correctly access the CSFB-capable MSC while the SRVCC procedure can continue normally, thereby solving a problem in the prior art where a UE is incapable of implementing a location service of a CS domain when an MME selects an SRVCC-incapable MSC in combined attach.

Figure 9:
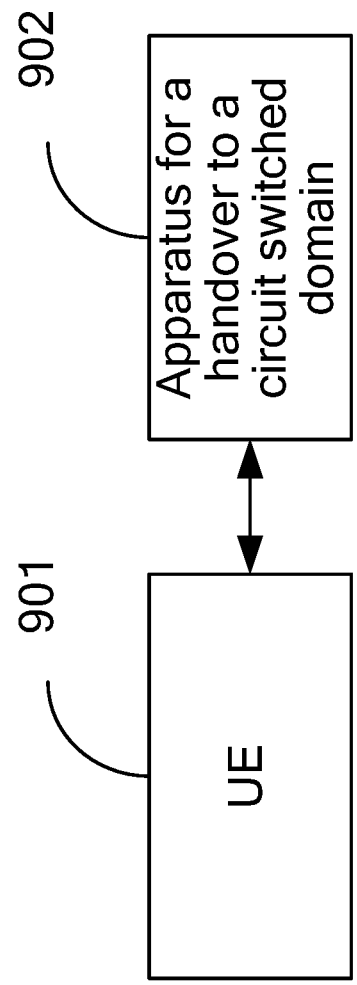
FIG. 9 is an architecture diagram of a system for a handover to a circuit switched domain according to another embodiment of the present invention.

Referring to FIG. 9, a system for a handover to a circuit switched domain is provided in another embodiment of the present invention, including a UE 901 and an apparatus 902 for a handover to a circuit switched domain; the UE 901 is configured to: if a location service of a circuit switched CS domain triggers an SRVCC procedure for the UE when the UE has a VOIP service in progress, hand over to the CS domain to access the MSC that is selected by the apparatus 902 and capable of both CSFB and SRVCC, and implement the location service of the CS domain.

Functions of the apparatus 902 are the same as functions of the apparatus provided in the foregoing embodiment.

The system provided in this embodiment may perform the method provided in any one of the foregoing method embodiments. For a detailed procedure, refer to the description in the method embodiments. Details are not described herein again.

In the foregoing system provided in this embodiment, the apparatus selects an MSC capable of both CSFB and SRVCC for a UE, and if a location service of a CS domain triggers an SRVCC procedure for the UE during an ongoing VOIP service of the UE, selects the MSC capable of both CSFB and SRVCC in the SRVCC procedure. In this way, it is ensured that the UE can correctly access the CSFB-capable MSC while the SRVCC procedure can continue normally, thereby solving a problem in the prior art where a UE is incapable of implementing a location service of a CS domain when an MME selects an SRVCC-incapable MSC in combined attach.

It should be noted that the units included in the foregoing user equipment embodiments are divided according to functional logic, but the present invention is not meant to be limited to the foregoing division, so long as the corresponding functions can be implemented. In addition, a specific name of each functional unit is for ease of distinguishing each other and is not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include a read-only memory, a magnetic disk, or an optical disc.

The foregoing descriptions are merely exemplary specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system comprising:
   a mobility management entity (MME); and
   at least two a mobile switching center (MSCs),
   wherein the at least two MSCs comprise a first MSC capable of supporting a circuit switched fallback (CSFB) and a single radio voice call continuity (SRVCC) and a second MSC not capable of supporting the SRVCC, and
   wherein the MME is configured to select the first MSC for a user equipment (UE) from the at least two MSCs in a combined tracking area update procedure of the UE when a location service of a circuit switched (CS) domain triggers a SRVCC procedure for the UE and when the UE has a Voice over Internet Protocol (VOIP) service in progress.

2. The system according to claim 1, wherein the UE is handed over to the CS domain.

3. The system according to claim 2, wherein the UE is configured to access the first MSC capable of supporting the CSFB and the SRVCC when the location service of the CS domain triggers the SRVCC procedure and when the VOIP service is in progress, and wherein the first MSC is selected by the MME.

4. The system according to claim 3, wherein the UE is configured to implement the location service of the CS domain.

5. An apparatus comprising:
   a processor configured to:
   select a first mobile switching center (MSC) capable of supporting a circuit switched fallback (CSFB) and a single radio voice call continuity (SRVCC) for a user equipment (UE) from at least two MSCs in a combined tracking area update procedure of the UE, wherein the at least two MSCs comprise a first MSC capable of supporting the CSFB and the SRVCC and a second MSC capable of not supporting the SRVCC; and
   select the first MSC in the combined tracking area update procedure when a location service of a circuit switched (CS) domain triggers an SRVCC procedure for the UE and when the UE has a voice over Internet Protocol (VOIP) service in progress.

6. The system according to claim 1, wherein the UE is configured to access the first MSC capable of supporting the CSFB and the SRVCC when the location service of the CS domain triggers the SRVCC procedure and when the VOIP service is in progress, and wherein the first MSC is selected by the MME.

7. The system according to claim 1, wherein the UE is configured to implement the location service of the CS domain.

8. The apparatus according to claim 5, wherein the UE is handed over to the CS domain.

* * * * *